April 4, 1967 J. F. MARTIN ETAL 3,312,783
SIGNAL AMPLITUDE SEQUENCED TIME DIVISION MULTIPLEX COMMUNICATION SYSTEM
Filed Aug. 7, 1964
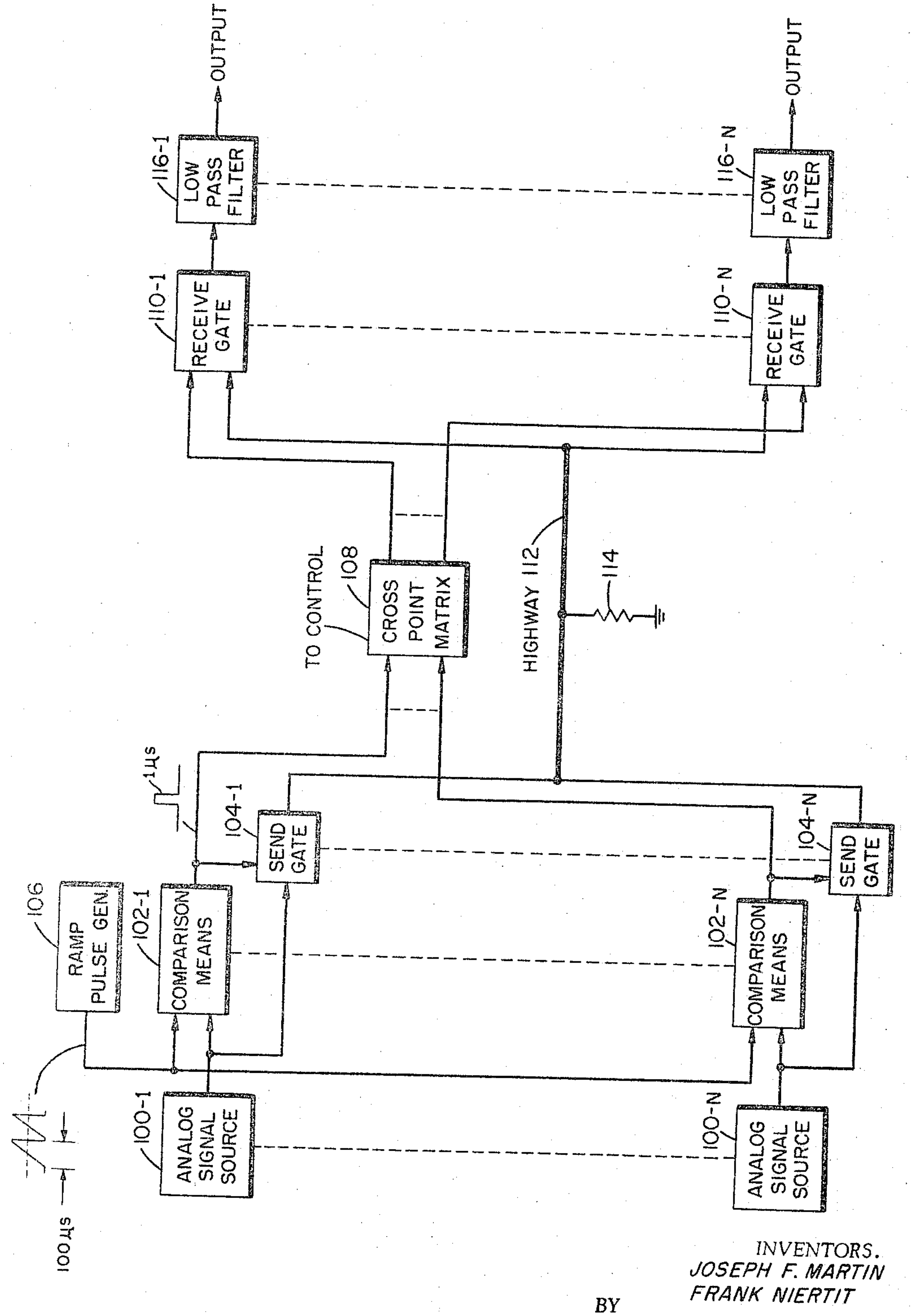
INVENTORS.
JOSEPH F. MARTIN
FRANK NIERTIT
BY George J. Seligsohn
ATTORNEY 3,312,783
SIGNAL AMPLITUDE SEQUENCED TIME DIVISION MULTIPLEX COMMUNICATION SYSTEM

Joseph F. Martin, Webster, and Frank Niertit, West Webster, N.Y., assignors, by mesne assignments, to Stromberg-Carlson Corporation, Rochester, N.Y., a corporation of Delaware Filed Aug. 7, 1964, Ser. No. 388,146
6 Claims. (Cl. 179—15)

This invention relates to a time division multiplex communication system and, more particularly, to such a system which is signal amplitude sequenced, i.e., where the time of occurrence of a signal sample during each repetitive time frame is determined by the instantaneous amplitude of the signal being sampled.

In a conventional time division multiplex communication system a repetitive time frame is divided into a predetermined number of non-overlapping time slots. A different time slot is allotted to each one of a plurality of simultaneous independent communications carried over a common transmission highway. An individual, normally closed, send gate associated with each communication has its output coupled to a common transmission highway and an individual, normally closed, receive gate associated with each communication has its input coupled to the common transmission highway. The pair of send and receive gates associated with each particular communication is opened only during the time slot allotted to that communication, whereby amplitude modulated sample pulses of each communication are transmitted from various analog signal sources which are individually coupled to the inputs of the respective send gates to the outputs of the respective receive gates corresponding thereto. An individual low-pass filter having its input coupled to the output of each receive gate integrates the amplitude modulated pulses applied thereto to thereby reproduce at the output of each low-pass filter the analog signal applied to the input of the send gate corresponding thereto.

It will be seen that during each successive time frame amplitude modulated pulses originating at each independent analog signal source are sequentially transmitted over the common transmission highway during the successive time slots composing each time frame. Since the common transmission highway unavoidably must have a certain reactance, it has been found that a small residual signal is stored by the common transmission highway at the end of each time slot which is proportional to the amplitude of the amplitude modulated pulse sample occupying that time slot. These residual signals cause unwanted crosstalk to take place, since successive analog signals transmitted are independent of each other so that there is no relationship between the amplitude of an amplitude modulated pulse sample transmitted during any one time slot and the amplitude of the amplitude modulated pulse sample transmitted during the next succeeding time slot. If the time slots are relatively long, only a minor problem is created. However, when the duration of a time slot approaches one microsecond or less, the problem of crosstalk becomes very significant.

One method utilized by the prior art to minimize this unwanted crosstalk is to transmit each amplitude modulated pulse sample only during a first portion of the time slot it occupies, utilizing the remaining latter portion of each time slot as a guard period. During each guard period the common transmission highway is clamped to a point of fixed potential, such as ground. This permits substantially all of the residual signal then stored on the common transmission highway to be dissipated during that guard period, so that at the initiation of the next occurring sample any remaining residual signal from the previous sample is of negligible amplitude.

Since even the best of clamp circuits has a certain resistance which limits the discharge time constant of the common transmission highway, the guard period must have at least a certain minimum duration of clamping is to be effective in eliminating unwanted crosstalk. The fact that this is so limits the number of time slots into which a given time frame may be divided, thereby limiting the number of independent communications which may be transmitted over a common transmission highway.

The present invention departs from conventional time division multiplex communication systems in that in the present invention the send and receive gates associated with any one communication are opened for a time slot period at that particular time during each successive time frame when the instantaneous amplitude of an analog signal being sampled is equal to or at least differs by a predetermined amount from the instantaneous amplitude of a periodic signal having a period equal to one time frame, each cycle of which is preferably a linear ramp signal or at least is a signal which is a single valued function with respect to time and which has an amplitude range which is at least as great as the maximum amplitude range of any analog signal. On the other hand, in conventional time division multiplex communication systems the send and receive gates associated with each communication are opened during a particular time slot of a repetitive time frame the time of occurrence of which is fixed with respect to the beginning of each time frame and the time of occurrence of which is independent of the instantaneous amplitude of the analog signal being sampled.

It will be seen that the present invention makes it unnecessary to clamp the common transmission highway following each sampling, since any residual signal resulting from a first sample on the common transmission highway will, when two samples occur in quick succession, be approximately equal to the instantaneous amplitude of the second sample, or will, when a relatively long period exists between the occurrence of the first and second samples, be of negligible amplitude, since in this latter case the common transmission highway will have a relatively long period to discharge the residual signal between the occurrence of the first and second samples. However, even when the present invention is utilized, it may be necessary to clamp the common transmission highway to a point of fixed potential at the end of each time frame.

It is therefore an object of the present invention to provide a signal amplitude sequenced time division communication system.

This and other objects, features and advantages of the invention will become more apparent when taken together with the accompanying drawing in which the sole figure is a block diagram of a preferred embodiment of the invention.

Referring to the drawing, each of a plurality of independent analog signal sources, such as analog signal sources 100–1 . . . 100–N, has its output applied as a first input to a comparison means corresopnding thereto, such as comparison means 102–1 . . . 102–N, and also as an input to a normally closed send gate corresponding thereto, such as send gates 104–1 . . . 104–N.

A common ramp pulse generator 106 applies a periodic ramp signal as a second input to each of comparison means 102–1 . . . 102–N. In accordance with Nyquist's theorem, the fundamental frequency of the periodic ramp pulses generated by ramp pulse generator 106, which determines the duration of each time frame, is at least twice as high as the highest frequency component from any of analog signal sources 100–1 . . . 100–N which is to be transmitted. For illustrative purposes, it is assumed that the period of each ramp pulses is one hundred microseconds, and that the highest frequency component to be transmitted of any of the analog signals is therefore less than five thousand cycles per second.

In order to transmit signals without distortion, it is essential that the signal from ramp pulse generator 106 be a linear ramp. However, there may be occasions when it is desired to either compress or expand, as the case may be, the transmitted analog signals. In that case, the signal from ramp pulse generator 106 would not have a linear slope, as shown, but would be non-linear. What is essential, however, is that each periodic cycle of the signal from ramp pulse generator 106 be a single valued function with respect to time. Also, it is essential that the amplitude range of the signal from ramp pulse generator 106 be at least as great as the maximum amplitude range of any of the analog signals from analog signal source 100–1 . . . 100–N.

Each of comparison means 102–1 . . . 102–N compares the instantaneous amplitude of the analog signal applied as a first input thereto with the instantaneous amplitude of the signal from ramp pulse generator 106 applied as a second input thereto. Each of comparison means 102–1 . . . 102–N, produces a short output pulse preferably when the two inputs applied thereto have equal instantaneous amplitudes. However, it is essential only that each of comparison means 102–1 . . . 102–N produces the short pulse when a predetermined amplitude difference exists between the instantaneous amplitudes of the two inputs applied thereto, equality being only that special case where the predetermined difference is zero.

The output pulse produced by any of comparison means 102–1 . . . 102–N has a duration which is very much smaller than the duration of one period of the signal from ramp pulse generator 106. For illustrative purposes, it is assumed that the duration of an output pulse from any of comparison means 102–1 . . . 102–N is one microsecond, which is only one percent of the one hundred microsecond period of the signal from ramp pulse generator 106. Output pulses from each respective one of comparison means 102–1 . . . 102–N is applied to that one of normally closed send gates 104–1 . . . 104–N corresponding therewith to effect the opening of that corresponding one of send gates 104–1 . . . 104–N for the duration of an output pulse, i.e., for one microsecond.

The output from each respective one of comparison means 102–1 . . . 102–N is applied as a separate input to cross-point matrix 108. Cross-point matrix 108, which is well known in the art and the details of which form no part of this invention, serves to produce an output pulse on a selected one of a plurality of output conductors thereof in response to an input pulse being applied to a selected one of a plurality of input conductors thereof, the correlation between respective output conductors and respective input conductors being made in accordance with control information supplied to cross-point matrix 108 from control means (not shown).

Each of the output conductors of cross-point matrix 108 is separately coupled to each of a plurality of normally closed receive gates, such as receive gates 110–1 . . . 110–M. The application of an output pulse from any one of comparison means 102–1 . . . 102–N to cross-point matrix 108 will result in this output pulse being forwarded to a selected one of the output conductors of cross-point matrix 108 in accordance with the control information supplied to cross-point matrix 108 where it will be applied to that one of receive gates 110–1 . . 110–M to which that output conductor of cross-point matrix 108 is coupled. The application of an output pulse to any one of receive gates 110–1 . . . 110–M will result in the opening of that normally closed receive gate for the duration of that output pulse, i.e., one microsecond. Thus, it will be seen that the production of an output pulse from any one of comparison means 102–1 . . . 102–N will result in the simultaneous opening of the send gate associated therewith and the receive gate associated therewith by means of cross-point matrix 108.

The output of all of send gates 104–1 . . . 104–N are connected in common to common transmission highway 112, which has an effective relatively high resistance to ground, represented by resistance 114. Common transmission highway 112 is connected in common as an input to each of receive gates 110–1 . . . 110–M.

It will thus be seen that when any one of normally closed send gates 104–1 . . . 104–N and that certain one of normally closed receive gates 110–1 . . . 110–M which by virtue of cross-point matrix 108 corresponds therewith are simultaneously opened by an output pulse from that one of comparison means 102–1 . . . 102–N corresponding therewith, an amplitude modulated sample pulse from that one of analog signal sources 100–1 . . . 100–N corresponding to that comparison means will be applied through the then open one of send gates 104–1 . . . 104–N, common transmission highway 112 and the then open one of receive gates 110–1 . . . 110–M to the output of that receive gate.

The output of each of receive gates 110–1 . . . 110–M is applied to the input of an individual low-pass filter 116–1 . . . 116–M corresponding therewith. Each of low-pass filters 116–1 . . . 116–M has a cut-off frequency which is higher than the highest frequency component of any analog signal to be transmitted, but which is lower than the fundamental frequency of the signal from ramp pulse generator 106. Therefore, each of low-pass filters 116–1 . . . 116–M will serve to integrate the amplitude modulated sample pulses applied as an input thereto to thereby produce an analog signal output which, if the signal from ramp pulse generator 106 has a linear slope, is a faithful reproduction of the analog signal transmitted thereto. If the signal from ramp pulse generator 106 is non-linear, the output from each of low-pass filters 116–1 . . . 116–M will be an analog signal which is a predetermined function of the analog signal transmitted thereto.

Although only a preferred embodiment of the present invention has been described herein, it is not intended that the invention be restricted thereto, but that it be limited only by the true spirit and scope of the appended claims.

What is claimed is:

1. A time division multiplex communication system for transmitting an analog signal from an originating point to a terminating point, said system comprising a source of analog signal coupled to said originating point, a periodic signal source for producing a periodic signal having a fundamental frequency which is at least twice as high as the highest frequency component of said analog signal to be transmitted, each cycle of said periodic signal being a predetermined single-valued function with respect to time and having an amplitude range which is at least as great as the maximum amplitude range of said analog signal, a transmission highway, a low-pass filter having a cut-off frequency which is greater than said highest frequency component of said analog signal and less than said fundamental frequency of said periodic signal, a normally closed send gate coupling said originating point to said transmission highway, a normally closed receive gate coupling said transmission highway to the input of said filter, means for coupling the output of said filter to said terminating point, and comparison means coupled to said originating point, said periodic signal source and said send and receive gates for simultaneously opening said normally closed send and receive gates momentarily in response to a predetermined amplitude difference existing between the instantaneous amplitude of said analog signal and the instantaneous amplitude of said periodic signal.

2. The system defined in claim 1, wherein said single-valued function is a linear ramp.

3. The system defined in claim 1, wherein said predetermined difference is zero.

4. A time division multipex communication system for transmitting each of a plurality of independent analog signals from a separate originating point to at least one preselected terminating point corresponding thereto, said system comprising a separate source of analog signal coupled to each separate originating point, a periodic signal for producing a periodic signal having a fundamental frequency which is at least twice as high as the highest frequency component of any analog signal to be transmitted, each cycle of said periodic signal being a predetermined single-valued function with respect to time and having an amplitude range which is at least as great as the maximum amplitude range of any analog signal, a common transmission highway, a separate low-pass filter corresponding to each terminating point having a cutoff frequency which is greater than said highest frequency component of any analog signal and less than said fundamental frequency of said periodic signal, a separate normally closed send gate corresponding to each originating point for coupling the originating point to which it corresponds to said common transmission highway, a separate normally closed receive gate corresponding to each terminating point for coupling said common transmission highway to the input of the filter corresponding to the terminating point with which it corresponds, individual means coupling the output of each filter to the terminating point with which it corresponds, and means including a separate comparison means corresponding to each originating point coupled to the originating point with which it corresponds, said periodic signal source, said send gate corresponding to the originating point with which it corresponds and the receive gate corresponding to that preselected terminating point which corresponds to the originating point with which it corresponds for simultaneously opening momentarily said send and receive gates to which that comparison means is coupled in response to a predetermined amplitude difference existing between the instantaneous amplitude of the analog signal applied thereto and the instantaneous amplitude of said periodic signal.

5. The system defined in claim 4, which said single-valued function is a linear ramp.

6. The system defined in claim 4, wherein said predetermined difference is zero.

References Cited by the Examiner

UNITED STATES PATENTS 3,158,691 11/1964 Brightman ----------- 179—15

DAVID G. REDINBAUGH, *Primary Examiner.*

R. L. GRIFFIN, *Assistant Examiner.*